(12) United States Patent
Baughman et al.

(10) Patent No.: US 11,132,060 B2
(45) Date of Patent: Sep. 28, 2021

(54) COLLABORATIVE INTERACTIONS AND FEEDBACK WITH MIDAIR INTERFACES

(71) Applicant: International Business Machines Corporation, Armonk, NY (US)

(72) Inventors: Aaron K. Baughman, Silver Spring, MD (US); Aaron Cox, Sherman, CT (US); John Joseph Kent, North Attleboro, MA (US); Stephen C. Hammer, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/209,179

(22) Filed: Dec. 4, 2018

(65) Prior Publication Data

US 2020/0174570 A1 Jun. 4, 2020

(51) Int. Cl.
*G06F 3/0482* (2013.01)
*G06F 3/01* (2006.01)
*G06K 9/00* (2006.01)
*G03H 3/00* (2006.01)

(52) U.S. Cl.
CPC ............ *G06F 3/016* (2013.01); *G03H 3/00* (2013.01); *G06F 3/011* (2013.01); *G06K 9/00355* (2013.01)

(58) Field of Classification Search
CPC ............................. G06F 3/04817; G06F 3/011
See application file for complete search history.

(56) References Cited

U.S. PATENT DOCUMENTS

| 2004/0046709 A1* | 3/2004 | Yoshino | H04N 13/395 345/6 |
| 2008/0018591 A1* | 1/2008 | Pittel | G06F 1/1686 345/156 |
| 2010/0208313 A1* | 8/2010 | Horgan | G03H 1/0252 359/2 |

(Continued)

FOREIGN PATENT DOCUMENTS

CN 103513764 B 4/2017

OTHER PUBLICATIONS

Patricia Ivette Cornelio Martinez et al., Agency in Mid-air Interfaces, Proceedings of CHI Conference on Human Factors in Computing Systems, 2017.

(Continued)

*Primary Examiner* — Rayeez R Chowdhury
(74) *Attorney, Agent, or Firm* — Garg Law Firm, PLLC; Rakesh Garg; Anthony V England

(57) ABSTRACT

In an embodiment, a method includes detecting a motion pattern in proximity to a first midair interface (MAI) device, the motion pattern being of a body part of a user. In an embodiment, the method includes converting the detected motion pattern to a simulated surface of an object projected from a shared MAI device, wherein the first MAI device and the shared MAI device each correspond to a different user. In an embodiment, the method includes causing a behavior change in the simulated surface being projected from the shared MAI device. An embodiment includes a computer usable program product. The computer usable program product includes a computer-readable storage device, and program instructions stored on the storage device.

17 Claims, 6 Drawing Sheets

(56) References Cited

U.S. PATENT DOCUMENTS

| | | | | |
|---|---|---|---|---|
| 2012/0170089 A1* | 7/2012 | Kim | ................... | G06F 3/04883 359/9 |
| 2013/0342459 A1* | 12/2013 | Karakotsios | ........ | G06F 3/04186 345/159 |
| 2014/0306891 A1* | 10/2014 | Latta | ....................... | G06F 3/011 345/158 |
| 2016/0171158 A1* | 6/2016 | Park | ........................ | G06K 9/46 715/771 |
| 2016/0253835 A1* | 9/2016 | Conness | ................ | G06F 3/013 715/716 |
| 2018/0101234 A1 | 4/2018 | Carter et al. | | |

OTHER PUBLICATIONS

Ali M. Shtarbanov, Taking Mid-Air Haptics to the Next Level and Liberating the Interactice Multimodal Experience, MIT, 2016.
List of IBM related applications, Appendix P, 2018.

* cited by examiner

COLLABORATIVE INTERACTIONS AND FEEDBACK WITH MIDAIR INTERFACES

TECHNICAL FIELD

The present invention relates generally to a method, system, and computer program product for simulations of physical objects using holograms and interactions with such simulated objects. More particularly, the present invention relates to a method, system, and computer program product for collaborative interactions and feedback with midair interfaces.

BACKGROUND

Proprioception is an individual's sense of the relative position of body parts and effort employed in movement. For example, proprioception can allow an individual to perceive the position of a joint without the aid of vision.

A midair interface (MAI) is a simulation of a solid three-dimensional physical object in a medium, such as air, by projecting a shape in the medium. Upon touching, the simulated object feels like the three-dimensional physical object in some respects. The projections in the medium are holographic projections (holograms), where the tactile properties are achieved by forming the projection using ultrasonic sound waves in the medium. A hologram formed by projecting sound into a medium may or may not present a visual rendering of the simulated object but are capable of providing a touch sensation, i.e., tactile feedback when interacting with the simulated object.

It is also possible to produce holograms using light or laser projections into a medium. Light-based holograms may be better at visual rendering of the simulated object but generally lack the capability to provide tactile feedback when interacting with the simulated object.

For the purposes of the illustrative embodiments, a hologram or simulation that is capable of providing tactile feedback is the MAI used and described herein. In other words, the MAI contemplated within the scope of the illustrative embodiments are similar to the holographic projections formed using sound waves to control the pressure in a medium or using pressure-controlled columns of the medium.

For example, a MAI simulated keyboard using air medium presents physical keys of a physical keyboard in midair, such that a tactile interaction with the simulated keys induces the brain of a human user (or a cognitive system of a humanoid) to cognitively perceive physical keys in midair. A MAI simulated key can be depressed and released in a manner similar to a physical key of a physical keyboard, by applying and releasing finger pressure against one or more projections that are shaping the air medium like a physical key.

A simulated key of the example is different from a physical key of the example physical keyboard in that a finger cannot normally puncture and go through a physical key whereas the finger can continue pressing the simulated key to eventually go through the simulated key. Other simulated objects are generally representative of the physical shape, size, and tactile feel of a corresponding physical object but are non-solid unlike the corresponding physical object and similarly puncturable due to the non-solid nature of the medium that is used to form the simulated object.

For the clarity of the description and without implying any limitation thereto, air is assumed to be the medium when describing various operations and embodiments. Other media, such as water or a different gas or fluid can similarly be used in the manner of a described operation or embodiment without departing the scope of the illustrative embodiments. Additionally, for the purposes of the clarity of the description and without implying any limitation on the illustrative embodiments, a human user is assumed to be interacting with an MAI. From this disclosure, those of ordinary skill in the art will be able to adapt an embodiment to operate in a similar manner with a humanoid or a machine that operates as a user of an MAI, and such adaptations are contemplated within the scope of the illustrative embodiments.

Devices are presently available to project holograms in air to form simulated objects of an MAI. For example, a device consisting of a grid of projection nozzles is presently available to form simulated objects above the device by adjusting jets of air projecting from the device towards a volume of air above the device.

A volume of air, which is shaped, formed, or pressure-adjusted using sound or other methods, to form an entirety or a portion of a simulated object for MAI is referred to herein as an "air form." An object or a portion thereof, simulated using one or more air forms is referred to herein as a simulated object, midair simulated shape, or variations of these phrases, unless expressly distinguished where used.

A midair interaction with an MAI is a manipulation of a simulated object in the MAI using tactile operations. For example, a simulated key can be touched, depressed, and released; a simulated ball can be held, turned, or squeezed; and a simulated graph can be touched, rubbed, or pushed, by application of physical force against the simulated object. A midair interaction induces a cognitive perception of a tactile feeling. When a human is interacting with the MAI, the interactions with the MAI cause the tactile perception to be a cognitively induced in a human brain. The human brain is a type of cognitive receptor. When a humanoid or machine is interacting with the MAI, the interactions with the MAI cause the tactile perception to be a cognitively induced in an appropriate cognitive receptor unit associated with the humanoid or machine. Hereinafter, a reference to cognitive induction is a reference to a tactile perception that results from physical interaction with a simulated object produced by an MAI, and which can be received and processed by the appropriate receptor.

Some MAI devices are independent MAI devices in that they can operate as stand-alone mobile devices. Such a MAI device either includes some or all the capabilities of a mobile device, including wireless data processing wireless data communication, wireless computing, accessing remote data processing systems, and performing web-based interactions and transactions.

Other MAI devices are dependent MAI devices in that they operate in conjunction with a mobile device. Such a MAI device performs certain functions while in communication with a mobile device described above.

SUMMARY

The illustrative embodiments provide a method, system, and computer program product. In an embodiment, a method includes detecting a motion pattern in proximity to a first midair interface (MAI) device, the motion pattern being of a body part of a user. In an embodiment, the method includes converting the detected motion pattern to a simulated surface of an object projected from a shared MAI device, wherein the first MAI device and the shared MAI device each correspond to a different user.

In an embodiment, the method includes causing a behavior change in the simulated surface being projected from the shared MAI device. In an embodiment, the method includes reconfiguring, prior to converting the detected motion, a second MAI device to the shared MAI device by (i) detecting a second motion pattern in proximity to the first MAI device and (ii) partitioning, based on the detected second motion pattern, the second MAI device into a set of MAI interfaces.

In an embodiment, the method includes assigning an interface of the set of MAI interfaces according to a direction of the second motion pattern. In an embodiment, the method includes detecting a plurality of interactions with a plurality of simulated surfaces of a plurality of MAI devices. In an embodiment, the method includes generating a resultant interaction from the plurality of interactions.

In an embodiment, the method includes converting the resultant interaction to a set of instructions for a subset of projection nozzles of the shared MAI device. In an embodiment, the method includes producing the resultant interaction at the subset of projection nozzles.

In an embodiment, the behavior change is a change in an air form rendering the simulated surface. In an embodiment, the method includes generating a proprioceptive stimulus for a user of the shared MAI device. In an embodiment, the proprioceptive stimulus is an electrical stimulus. In an embodiment, the proprioceptive stimulus is a change in an air form of the shared MAI device. In an embodiment, the motion pattern is detected by a camera.

In an embodiment, the method includes associating, based on the detected interaction, one interface of the set of MAI interfaces with a user performing the interaction. In an embodiment, the change in the simulated surface is a temperature change.

In an embodiment, the method includes coupling a thermal element with the MAI device, the thermal element being configured to increase a temperature of an air form being projected, the air form projecting a portion of the simulated surface.

In an embodiment, the method includes configuring the thermal element in an element of the shared MAI device, wherein the element projects the portion of the simulated surface. In an embodiment, the method includes modifying a projection nozzle of an element of MAI device to cause the change in the temperature, wherein the projection nozzle projects the portion of the simulated surface.

In an embodiment, the simulated surface of the object is projected using ultrasound. In an embodiment, the simulated surface of the object is projected using columns of air, a first column having a first controllable pressure and a second column having a second controllable pressure. In an embodiment, the motion pattern is detected by a camera.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
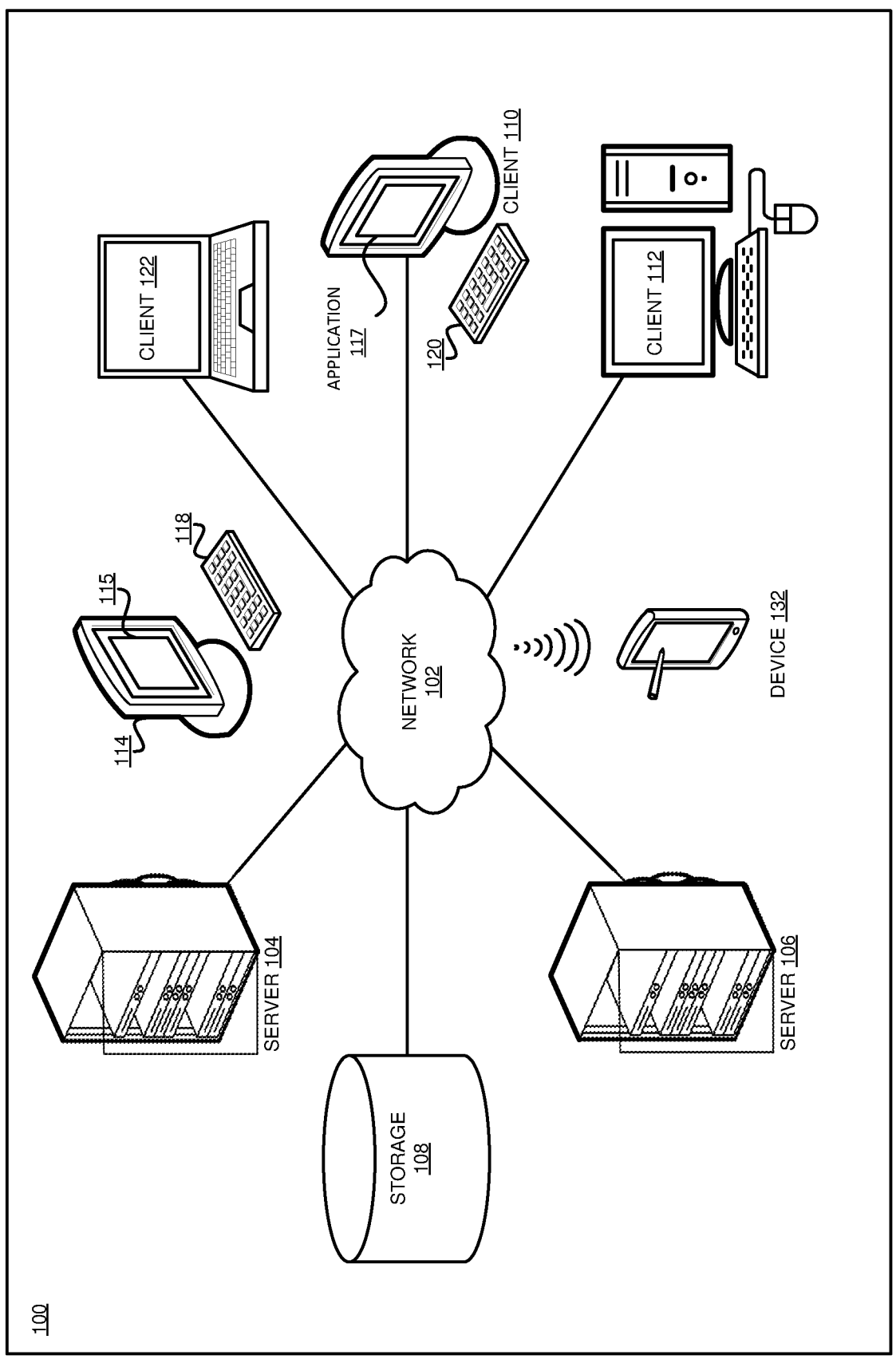
FIG. 1 depicts a block diagram of a network of data processing systems in which illustrative embodiments may be implemented.

Human-machine interfaces are a well-recognized technological field of endeavor. Computers and other machines require inputs from users and provide outputs to users via such human-machine interfaces. Computer keyboards, computer mouse or other pointing devices, digital stylus or similar writing instruments, touchscreens, and the like are common examples of human-machine interfaces for providing inputs. Some interfaces, such as a touchscreen or a pointing device, can provide tactile feedback through vibrations, change of textures, change of required force, change of pressure, and the like.

Projection of, and detecting interactions with, midair interfaces as an alternative human-machine interface is also a well-recognized technological field of endeavor. The present state of the technology in this field of endeavor has certain drawbacks and limitations. The operations of the illustrative embodiments impart additional or new capabilities to improve the existing technology in the technological field of endeavor of human-machine interfaces, especially in the area of midair interfaces.

The illustrative embodiments recognize that midair interfaces suffer from certain drawbacks. As one example, human users of MAIs have found that fingers, arms, and other extremities of the human body that are engaged when interacting with an MAI tend to become numb or progressively degraded in their sensation perceiving capabilities over a period of interactions. For example, it has been observed that an arm suspended in the air above an MAI device will start to fall numb over a period of suspension. The reduced sensitivity to tactile sensation at the finger tips also degrades as a result.

It has also been found that repetitive touching, pressing, rubbing, or other tactile manipulation of surfaces also tends to induce a progressive reduction in tactile sensitivities of the extremities being used. For example, if a user repeatedly touches or rubs a textured surface, the user's perception of the texture is known to degrade after a period of such tactile activity. This observation is true whether the surface is an actual physical surface or a simulated surface of a MAI.

As another example, users of presently available MAIs are incapable of interacting with each other. For example, a user of one MAI is incapable of receiving, at an MAI, projections corresponding to interactions from another user of an MAI. As another example, pushing, pulling, and other motions from users at respective MAIs are incapable of being represented at other MAIs with the presently available MAIs. The illustrative embodiments further recognize that presently available MAIs are incapable of representing an amount of force exerted by a user. For example, presently available MAIs are incapable of providing feedback between a plurality of MAIs based on interaction with a simulated surface of each of the plurality of MAIs.

The surface of a user's extremity that contacts an MAI for performing tactile operations is referred to herein as a "contact surface" unless expressly distinguished. A surface of a simulated object that is touched by a contact surface is referred to herein as an "object surface" unless expressly distinguished.

These and other collaborative interaction issues are disadvantages of using the presently available MAIs. The present state of the technological field of endeavor of human-machine interface via MAIs presently does not address collaborative interaction between users of MAIs. A need exists for collaborative interaction between users of MAIs.

The illustrative embodiments recognize that the presently available tools or solutions do not address these needs/problems or provide adequate solutions for these needs/problems. The illustrative embodiments used to describe the invention generally address and solve the above-described problems and other related problems by providing methods, systems, and computer program products for collaborative interaction and feedback with MAIs.

A device capable of projecting an MAI consisting of simulated objects formed using air forms is contemplated. Such a device is referred to herein as an MAI device. A prior-art MAI device can be modified using an embodiment to form a modified MAI device. To form a modified MAI device, an embodiment can be implemented as a combination of certain hardware components, e.g., the prior-art MAI device, and a software application. An implementation of an embodiment, or one or more components thereof, can be configured as a modification of an existing MAI device, with a companion software application executing in some combination of (i) the MAI device itself, (ii) a data processing system communicating with the MAI device over short-range radio or a local area network (LAN), and (iii) a data processing system communicating with the MAI device over a wide area network (WAN).

An embodiment causes the MAI device to produce collaborative interactions and feedback. The embodiment configures an MAI device to generate feedback from other users in a collaborative network.

To form an embodiment, an MAI system includes a camera to detect a pattern of motion in proximity to an MAI device of the MAI system. For example, suppose a first user and a second user, each having a respective MAI device, wish to interact. The second user executes a pattern of motion. The camera detects the pattern of motion. The embodiment associates the detected pattern of motion with an attempt to join a collaborative network with the first user. The embodiment assigns a portion of the first MAI device of the first user to present feedback from the second user. The embodiment assigns a portion of the second MAI device of the second user to present feedback from the first user.

Another embodiment produces a resultant force at a simulated surface of an object felt on a contact surface of a user. To form one embodiment, an MAI system includes a camera to detect a pattern of motion in proximity to an MAI device of the MAI system. For example, suppose that a first user is interacting with a first simulated surface of a first MAI device and a second user is interacting with a second simulated surface of a second MAI device. Further, suppose the first simulated surface and the second simulated surface represent similar object surfaces which the users wish to collaborate on. For example, the simulated surfaces can be a keyboard or a ball.

The embodiment is configured to convert a pattern of motion to a force tensor. In an embodiment, the camera detects the second user interacting with the second simulated surface. For example, the camera can detect the second user pushing a ball. The embodiment converts the detected pushing motion to a force tensor including a magnitude and direction of the applied push. In another example, the embodiment converts a plurality of detected patterns of motion to a resultant force tensor.

Accordingly, the embodiment causes an air form projecting the first simulated surface to change in response to the detected motion. For example, an air form projected the ball to the first user can increase to represent the ball being pushed against a contact surface of the first user.

Another embodiment produces a resultant force using a proprioceptive stimulus. For example, a resultant force tensor may represent a pull on a simulated surface of a ball. As an example, a first user may be grasping the simulated surface with a hand. The embodiment converts the resultant force to an electrical stimulus. For example, the electrical stimulus can produce a proprioceptive stimulus representing a force acting on the hand of the first user.

The illustrative embodiments are described with respect to certain types of MAI devices, media, volumes, media forms, users, simulated objects, contact surfaces, fluid flows, feature projections, repetitiveness, tactile sensations, object surfaces, algorithms, equations, configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
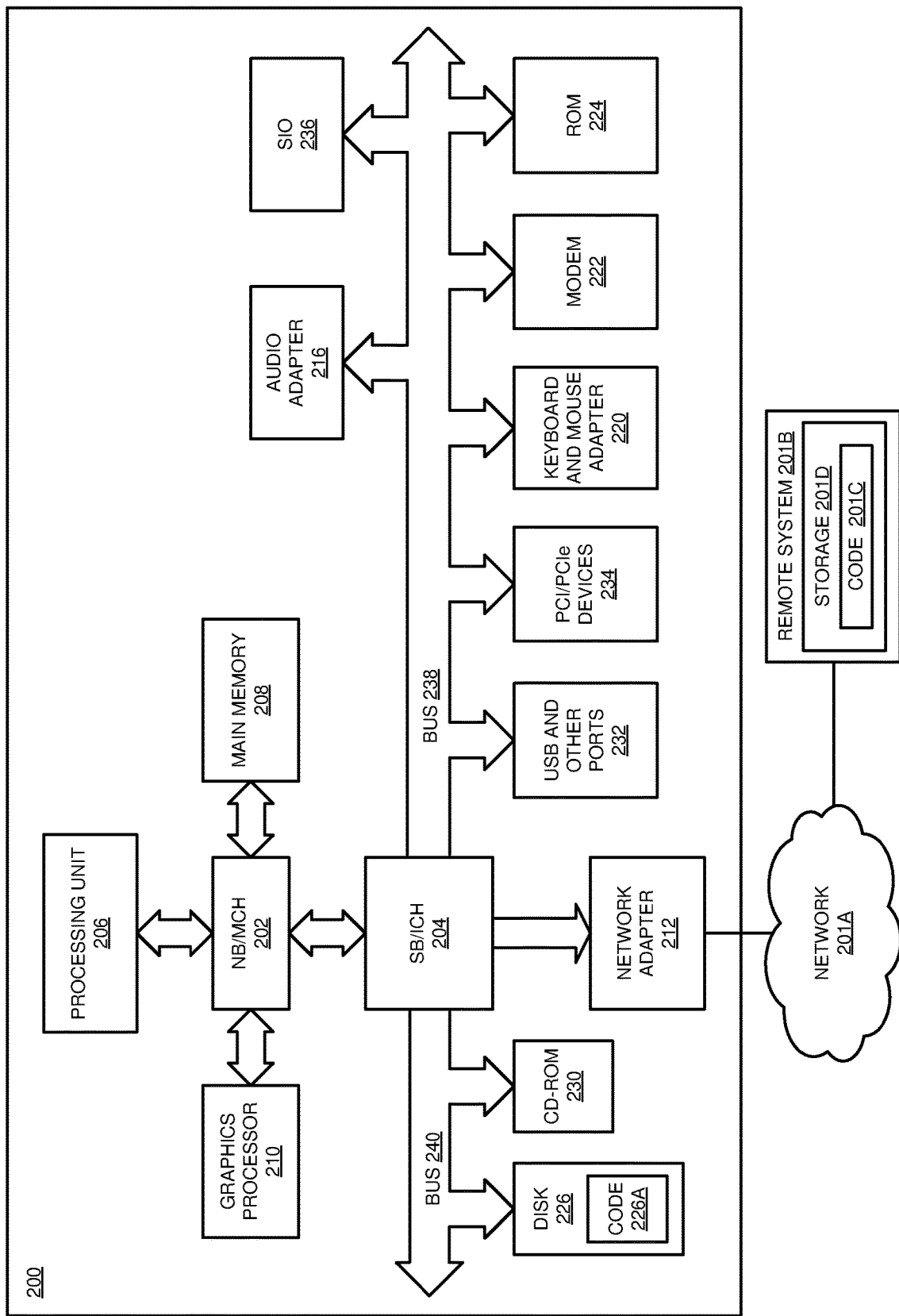
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, 114, and 118 are also coupled to network 102. A data processing system, such as server 104 or 106, or client 110, 112, 114, or 118 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, 118 are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, 114, and 118 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 115 implements an embodiment described herein. MAI device 116 uses application 115 to operate a software-implemented aspect of an embodiment as described herein. Application 115 performs motion gesture detection, shared device configuration, and interface generation. Camera 122 provides detected motion data at MAI device 116 to application 115. Application 119 also implements an embodiment described herein. MAI device 120 uses application 119 to operate a software-implemented aspect of an embodiment as described herein. Camera 124 provides detected motion data at MAI device 120 to application 119. MAI devices 116, 120 are examples of an MAI device described herein. Cameras 122, 124 implement an embodiment described herein to operate with MAI devices 116, 119 to perform an operation described herein, or both. Applications 115, 119 can be configured to use cameras 122, 124 to perform an operation described herein. MAI devices 116, 120 can be an independent MAI device or a dependent MAI device operating in conjunction with clients 114, 116 as described herein, such as over a wired or wireless data communication network.

Servers 104 and 106, storage unit 108, and clients 110, 112, 114, and 118 and device 132 may couple to network 102 using wired connections, wireless communication protocols, or other suitable data connectivity. Clients 110, 112, 114, and 118 may be, for example, personal computers or network computers.

In the depicted example, server 104 may provide data, such as boot files, operating system images, and applications to clients 110, 112, 114, 118. Clients 110, 112, 114, and 118 may be clients to server 104 in this example. Clients 110, 112, 114, 118 or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, 114, 118 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 115 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
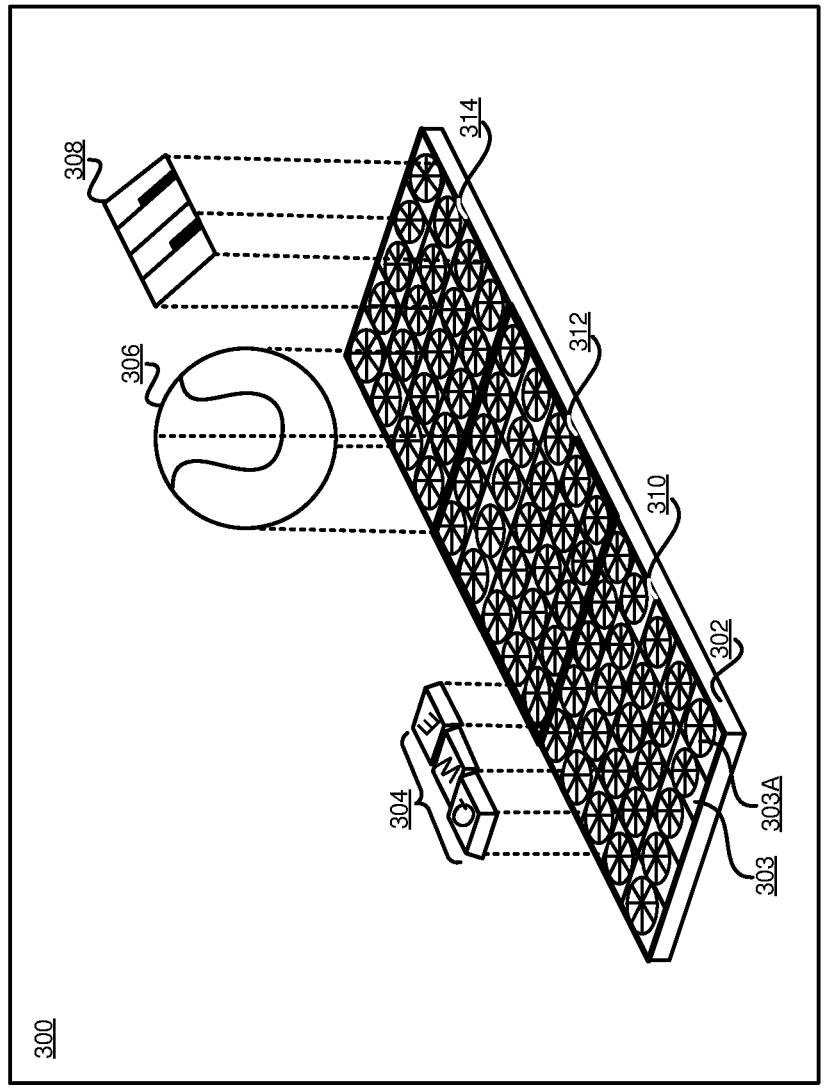
FIG. 3 depicts a block diagram of several example MAIs that are configured and manipulated in accordance with an illustrative embodiment.

With reference to FIG. 3, this figure depicts a block diagram of several example MAIs that are configured and manipulated in accordance with an illustrative embodiment. MAI device 302 is an example of MAI device 116, and includes an array of MAI elements 303. Each MAI element 303 includes a projection nozzle 303A as shown.

Application 115 provides the computational features to operate MAI device 302. For example, application 115 configures a shared MAI device, records an interaction at a first MAI device, translates the interaction to a stimulus at the shared MAI device, produces the stimulus at the shared MAI device, and other computation operations as described herein.

These examples of computation operations of a software implementation of all or a part of an embodiment are not intended to be limiting. From this disclosure, those of ordinary skill in the art will be able to determine many other computation operations that can be implemented in software to provide a feature of an embodiment described herein, and the same are contemplated within the scope of the illustrative embodiments.

As one example, a subset of projection nozzles in MAI device 302 can be used to project simulated keyboard keys 304. A key in simulated keys 304 can be touched, tapped, or used in typing in the same manner as a physical key on a physical keyboard.

As another example, a subset of projection nozzles in MAI device 302 can be used to project simulated ball 306. Ball 306 can be touched, gripped, caught, or thrown, or a force can be applied against ball 306 in the same manner as with a physical ball. For example, forces F1, F2, F3 represent virtual forces applied by a plurality of users in a collaborative network. Application 115 converts the forces to a resultant force produced at the MAI device 302. For example, resultant force, Fr, can represent a push against a contact surface of a first user interacting with ball 306.

As one example, a subset of projection nozzles in MAI device 302 can be used to project simulated piano keys 308. A key in simulated piano keys 308 can be touched, depressed, and released in the same manner as a physical key on a physical piano.

As another example, MAI device 302 can be a shared MAI device. A shared MAI device is subdivided into separate interface portions, each portion corresponding to a user and having a subset of projection nozzles. Portion 310 can correspond to a first user interface, where the first user is present at the MAI device 302. Portions 312, 314 can correspond to correspond to additional user interfaces, the additional users communicating with MAI device 302 through additional shared MAI devices connected to a network of data processing systems. Interaction at one shared MAI device is reproduced at another shared MAI device. For example, a user can depress a key in simulated piano keys 308 and the shared MAI device produces the interaction at a portion corresponding to the user.

Figure 4:
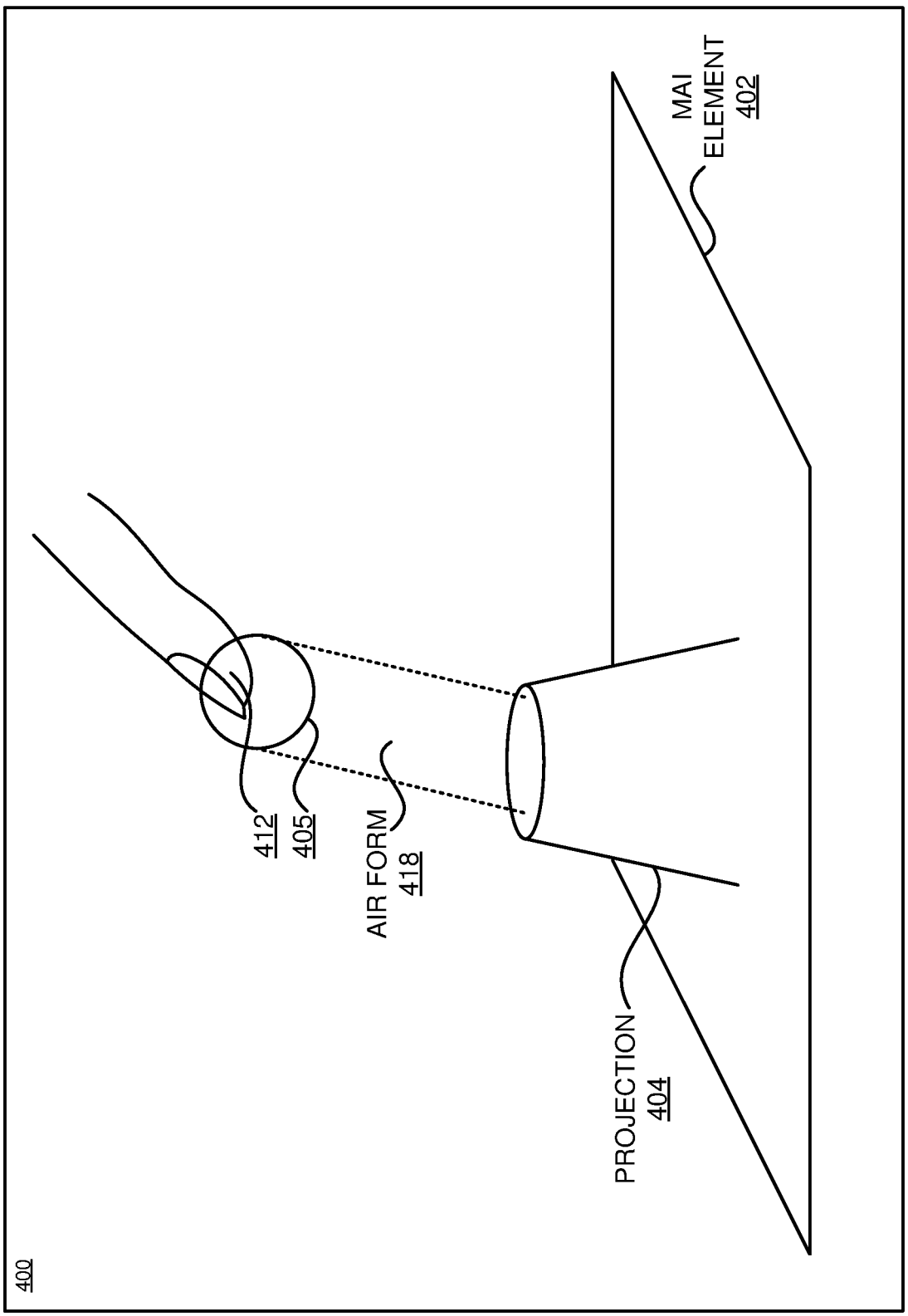
FIG. 4 depicts an example configuration for interactions with a midair interface in accordance with an illustrative embodiment.

With reference to FIG. 4, this figure depicts an example configuration for interactions with a midair interface in accordance with an illustrative embodiment. MAI element 402 is an example of MAI element 303 in FIG. 3. Projection nozzle 404 is an example of projection nozzle 303A in FIG. 3. Projection nozzle 404 projects air form 418 to render object surface 405. A contact surface is a portion of finger 412 in tactile contact with object surface 405. In an embodiment, projection nozzle 404 is a flexible nozzle. For example, projection nozzle 404 can be actuated to project air form 418 at a range of angles relative to a surface of MAI element 402.

Figure 5:
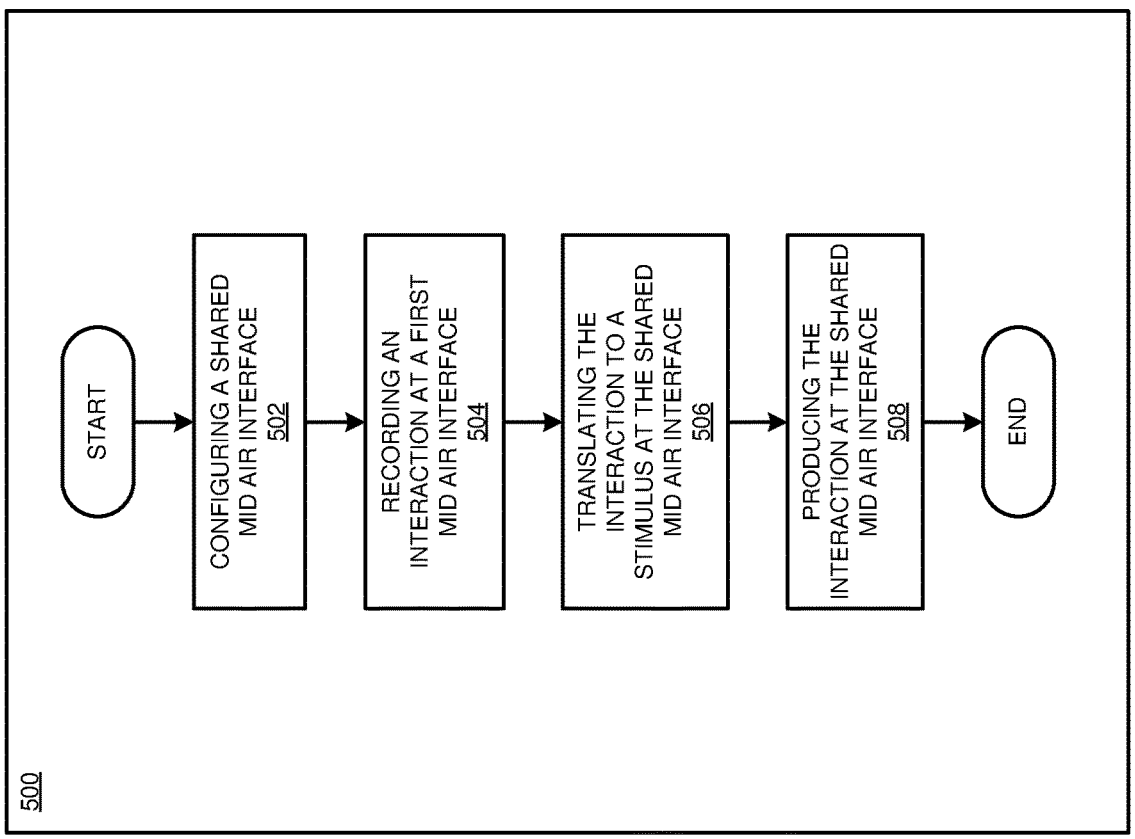
FIG. 5 depicts an example configuration for changing user interaction to accommodate collaborative interaction with a midair interface in accordance with an illustrative embodiment.

With reference to FIG. 5, this figure depicts an MAI system in accordance with an illustrative embodiment. MAI device 502 is an example of MAI device 302 in FIG. 3. As one example, a subset of projection nozzles in MAI device 502 can be used to project simulated ball 504. Ball 504 can be touched, gripped, caught, or thrown, or a force can be applied against ball 504 in the same manner as with a physical ball. An embodiment configures camera 506 to detect an applied force against ball 504. For example, camera 506 can be configured to detect a force F1 acting on ball 504, such as a push or a pull. Another embodiment configures camera 506 to detect a pattern of motion at MAI device 502. For example, camera 506 can be configured to detect a swiping motion at MAI device 502.

Figure 6:
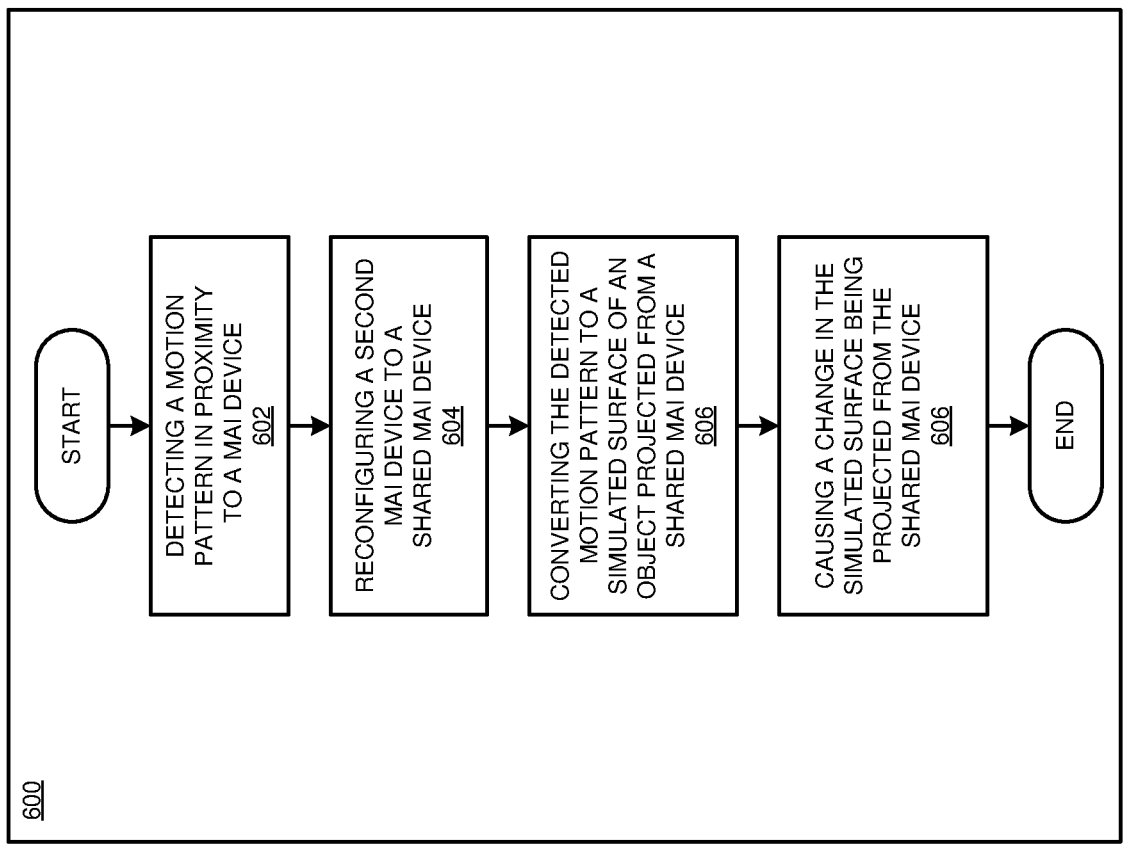
FIG. 6 depicts a flowchart of an example process for collaborative interactions and feedback with midair interfaces.

With reference to FIG. 6, this figure depicts an MAI system in accordance with an illustrative embodiment. MAI device 602 is an example of MAI device 302 in FIG. 3. An embodiment configures component 604 to execute application 115. For example, component 604 can receive a collaborative interaction, such as a plurality of applied forces at other MAI devices. Component 604 generates a resultant force tensor from the plurality of applied forces.

In an embodiment, component 604 provides the resultant force tensor as input to a proprioception device 606. An embodiment configures proprioception device 606 to generate a proprioception stimulus in response to the resultant force tensor. Proprioception device 606 converts the resultant force tensor to an electrical signal, S1. Proprioception device 606 transmits signal, S1, along a set of transmission lines 608 to a set of electrical stimulation pads 610 applied to a user. An embodiment configures signal, S1, to generate an proprioception stimulus at an extremity of the user. For example, an embodiment configures signal S1 to generate a proprioception stimulus 612 at a contact surface of the user. In an embodiment, proprioception stimulus 612 causes a movement of the extremity of the user. For example, proprioception stimulus 612 can cause a movement of the extremity corresponding to a magnitude and a direction of the resultant force tensor.

With reference to FIG. 7, this figure depicts an example configuration for providing collaborative feedback at an MAI interface in accordance with an illustrative embodiment. A first MAI device 702 is an example of MAI device 302 in FIG. 3. As one example, a subset of projection nozzles in MAI device 702 can be used to project simulated ball 704. Ball 704 can be touched, gripped, caught, or thrown, or a force can be applied against ball 704 in the same manner as with a physical ball.

A plurality of force tensors, such as $T_1$, $T_2$, $T_3$, can be applied to ball 704. For example, each force tensor can include a magnitude and a direction in a 3-dimensional space. In an embodiment, component 706 transmits the plurality of force tensors to a broker 708. Broker 708 generates a resultant force tensor 710 from the plurality of force tensors. An embodiment configures second MAI device 716 to project simulated ball 714 with resultant force tensor, $T_r$. For example, component 712 can configure a subset of projection nozzles in second MAI device 716 to project simulated ball 714. In an embodiment, the resultant force $T_r$ acts on a contact surface of a user of the second MAI device 716. For example, the resultant force $T_r$ can push against a contact surface of a user.

With reference to FIG. 8, this figure depicts an example configuration for providing collaborative feedback at an MAI interface in accordance with an illustrative embodiment. Projection nozzle 802 is an example of projection nozzle 303A in FIG. 3. Projection nozzle 802 projects air form 804 to render an object with a first force $F_1$. In an embodiment, $F_1$ includes a magnitude and direction. In an embodiment, projection nozzle 802 projects a second air form 806 in response to receiving instructions from an MAI device. For example, the instructions can include changing a magnitude of the projected air form, a direction of the projected air form, or both. Projection nozzle 802 projects air form 806 to render an object with a second force $F_2$. An embodiment configures projection nozzle 802 to project air form 806 in response to a resultant force received at the MAI device.

With reference to FIG. 9, this figure depicts an example configuration for providing collaborative interactions and feedback for MAI devices in accordance with an illustrative embodiment. Application 902 is an example of application 115 in FIG. 1. In an embodiment, application 902 can be included in an independent MAI device.

Application 902 includes collaboration component 904, broker component 906, and proprioception component 908. Application 902 receives a set of motion patterns 920. In an embodiment, each motion pattern of the set of motion patterns can be detected at a separate MAI device. For example, each MAI device can include a camera, such as camera 506 in FIG. 5, configured to detect a motion pattern. In an embodiment, each motion pattern of the set of motion patterns correspond to a user with an MAI device attempting to join a shared network of MAI devices. Collaboration component 904 can be configured to partition an MAI device into a set of portions for a set of users. In an embodiment, MAI placement component 904 determines assignment of the set of portions by analyzing the set of motion patterns. For example, collaboration component 904 can assign a lower right portion of a shared MAI device to a user performing a swiping motion pattern in the same direction.

Application 902 receives input force tensors 918. In an embodiment, input force tensors 918 correspond to a set of input forces. For example, input force tensors 918 can correspond to a set of input forces generated by a set of users of a shared network. Broker 906 converts the set of input force tensors 918 to a resultant tensor 912. For example, broker 906 can sum the magnitudes and directions of the input force tensors 918 to generate the resultant tensor 912. In an embodiment, broker component 906 transmits a set of instructions for the resultant tensor $T_r$ to a subset of projection nozzles 926 of a shared MAI device. In an embodiment, broker component 906 converts the resultant tensor to a set of instructions to change an air form projected by the subset of projection nozzles 926. For example, broker component 906 can instruct the subset of projection nozzles 926 to change a direction, a magnitude of flow, or both for a projected air form to reproduce the resultant force tensor at the shared MAI device. In another embodiment, application 902 receives a vocal command corresponding to an input force. For example, application 902 can receive a vocal command to push or pull a ball or press a key. In an embodiment, broker component 906 converts the vocal command to a corresponding input force for generating the resultant tensor 912.

Proprioception component 908 generates collaborative interaction and feedback at a shared MAI device. In an embodiment, proprioception component 908 converts the resultant tensor 912 to an air form component 914 and an electrical stimulus component 916. Air form component 914 sends a set of air form instructions 922 to a subset of projection nozzles 926 of a shared MAI device. In an embodiment, the subset of projection nozzles 926 project a simulated surface of an object. In an embodiment, air form instructions 922 instruct the subset of projection nozzles 926 to produce a proprioceptive stimulus for a user of the shared MAI device. For example, air form instructions 922 can instruct the subset of projection nozzles 926 to project an air form causing the user to shift an extremity.

In an embodiment, electrical stimulus component 916 transmits a set of electrical instructions 924 to a proprioception device associated with the shared MAI device. Electrical stimulus component 916 configures the set of electrical instructions 924 to generate an electrical stimulus for a user of the shared MAI device. For example, the set of electrical instructions 924 can cause a user to feel an applied force from the resultant force tensor through electrical stimulation by a proprioception device 928.

With reference to FIG. 10, this figure depicts a flowchart of an example process for collaborative interactions and feedback with midair interfaces. Process 1000 can be implemented in application 115 in FIG. 1. The application configures a shared mid air interface (block 1002). The application records (detects) an interaction (motion pattern) at a first mid air interface (block 1004).

The application translates the interaction to a stimulus at the first mid air interface (block 1006). The application produces the interaction at the first mid air interface (block 1008). The application ends process 1100 thereafter.

With reference to FIG. 11, this figure depicts a flowchart of an example process for collaborative interactions and feedback with midair interfaces. Process 1100 can be implemented in application 115 in FIG. 1.

The application detects a motion pattern in proximity to a first MAI interface (block 1102). In an embodiment, the application detects a motion pattern of a limb of a user with a camera. The application reconfigures a second MAI device to a shared MAI device (block 1104). In an embodiment, the application detects an interaction with a simulated surface of an object projected from the second MAI device. The application partitions, based on the detected interaction, the second MAI device into a set of MAI interfaces, each interface of the set of MAI interfaces configured to project a simulated surface of an object corresponding to a separate user.

The application converts the detected motion pattern to a simulated surface of an object projected from a shared MAI device (block 1106). In an embodiment, the first MAI device and the shared MAI device each correspond to a different user. The application causes a behavior change in the simulated surface being projected (block 1108). The application ends process 1100 thereafter.

With reference to FIG. 12, this figure depicts a flowchart of an example process for collaborative interactions and feedback with midair interfaces. Process 1200 can be implemented in application 115 in FIG. 1.

The application generates a resultant interaction (force tensor) from a set of motion patterns (input force tensors) (block 1202). The application configures an air form in response to the resultant interaction (block 1204). The application generates the air form at a first MAI device (block 1206). In another embodiment, the application generates a proprioceptive stimulus for a user of the first MAI device (block 1208). The application ends process 1200 thereafter.

Thus, a computer implemented method, system or apparatus, and computer program product are provided in the illustrative embodiments for collaborative interactions and feedback for midair interfaces and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    detecting a motion pattern in proximity to a first portion of a shared midair interface (MAI) device, the motion pattern being of a body part of a first user;
    using the detected motion pattern as a basis of changing a simulated surface of an object by changing an amount of air that is projected from one or more projection nozzles of a second portion of the shared MAI device,
    wherein the changing of the amount of air causes tactile feedback to a second user corresponding to the motion pattern by the first user,
    wherein the changing of the amount of air projected from the one or more projection nozzles is based on a force tensor, and
    wherein the first portion of the MAI device and the second portion of the shared MAI device correspond to the first user and the second user, respectively;
    causing a behavior change in the simulated surface being projected from the second portion of the shared MAI device;
    detecting a plurality of interactions with a plurality of simulated surfaces of a plurality of portions of the MAI device, the plurality of portions including the first portion and the second portion;
    generating a resultant interaction from the plurality of interactions; and
    converting the resultant interaction to a set of instructions for a subset of projection nozzles of the second portion of the shared MAI device.

2. The method of claim 1, further comprising:
    reconfiguring, prior to converting the detected motion, the shared MAI device by (i) detecting a second motion pattern by the second user in proximity to the shared MAI device and (ii) partitioning, based on the detected second motion pattern, the shared MAI device to include the second portion assigned to the second user.

3. The method of claim 2, further comprising:
    assigning a location for the second portion of the shared MAI device according to a direction of the second motion pattern.

4. The method of claim 1, causing the behavior change further comprising:
    producing the resultant interaction at the subset of projection nozzles.

5. The method of claim 1, wherein the behavior change is a change in an air form rendering the simulated surface.

6. The method of claim 1, generating a proprioceptive stimulus for the second user of the shared MAI device.

7. The method of claim 6, wherein the proprioceptive stimulus is an electrical stimulus.

8. The method of claim 6, wherein the proprioceptive stimulus is a change in an air form of the shared MAI device.

9. The method of claim 1, wherein the motion pattern is detected by a camera.

10. A computer usable program product comprising a computer-readable storage medium, and program instructions stored on the storage medium, the stored program instructions comprising:
    program instructions to detect a motion pattern in proximity to a first portion of a shared midair interface (MAI) device, the motion pattern being of a body part of a first user;
    program instructions to use the detected motion pattern as a basis of changing a simulated surface of an object by changing an amount of air that is projected from one or more projection nozzles of a second portion of the shared MAI device,
    wherein the changing of the amount of air causes tactile feedback to a second user corresponding to the motion pattern by the first user,
    wherein the changing of the amount of air projected from the one or more projection nozzles is based on a force tensor, and
    wherein the first portion of the MAI device and the second portion of the shared MAI device correspond to the first user and the second user, respectively;
    program instructions to cause a behavior change in the simulated surface being projected from the second portion of the shared MAI device;
    program instructions to detect a plurality of interactions with a plurality of simulated surfaces of a plurality of portions of the MAI device, the plurality of portions including the first portion and the second portion;
    program instructions to generate a resultant interaction from the plurality of interactions; and
    program instructions to convert the resultant interaction to a set of instructions for a subset of projection nozzles of the second portion of the shared MAI device.

11. The computer usable program product of claim 10, wherein the computer usable code is stored in a computer readable storage device in a data processing system, and wherein the computer usable code is transferred over a network from a remote data processing system.

12. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

13. The computer usable program product of claim 10, the stored program instructions further comprising:
    program instructions to reconfigure, prior to converting the detected motion, the shared MAI device by (i) detecting a second motion pattern by the second user in proximity to the shared MAI device and (ii) partitioning, based on the detected second motion pattern, the shared MAI device to include the second portion assigned to the second user.

14. The computer usable program product of claim 13, the stored program instructions further comprising:

program instructions to assign a location for the second portion of the shared MAI device according to a direction of the second motion pattern.

15. The computer usable program product of claim 10, the stored program instructions further comprising:
program instructions to produce the resultant interaction at the subset of projection nozzles.

16. A computer system comprising a processor, a computer-readable memory, and a computer-readable storage device, and program instructions stored on the storage device for execution by the processor via the memory, the stored program instructions comprising:
program instructions to detect a motion pattern in proximity to a first portion of a shared midair interface (MAI) device, the motion pattern being of a body part of a first user;
program instructions to use the detected motion pattern as a basis of changing a simulated surface of an object by changing an amount of air that is projected from one or more projection nozzles of a second portion of the shared MAI device,
wherein the changing of the amount of air causes tactile feedback to a second user corresponding to the motion pattern by the first user,
wherein the changing of the amount of air projected from the one or more projection nozzles is based on a force tensor, and
wherein the first portion of the MAI device and the second portion of the shared MAI device correspond to the first user and the second user, respectively;
program instructions to cause a behavior change in the simulated surface being projected from the second portion of the shared MAI device;
program instructions to detect a plurality of interactions with a plurality of simulated surfaces of a plurality of portions of the MAI device, the plurality of portions including the first portion and the second portion;
program instructions to generate a resultant interaction from the plurality of interactions; and
program instructions to convert the resultant interaction to a set of instructions for a subset of projection nozzles of the second portion of the shared MAI device.

17. The method of claim 1, further comprising:
converting the motion pattern of the first user to the force tensor.

* * * * *